US 7,355,353 B2

(12) United States Patent
Inoue

(10) Patent No.: US 7,355,353 B2
(45) Date of Patent: Apr. 8, 2008

(54) ILLUMINATION CONTROL CIRCUIT

(75) Inventor: Takao Inoue, Saitama (JP)

(73) Assignee: Pioneer Corporation, Tokyo (JP)

( * ) Notice: Subject to any disclaimer, the term of this patent is extended or adjusted under 35 U.S.C. 154(b) by 5 days.

(21) Appl. No.: 10/594,677

(22) PCT Filed: Mar. 29, 2005

(86) PCT No.: PCT/JP2005/005948

§ 371 (c)(1),
(2), (4) Date: Sep. 28, 2006

(87) PCT Pub. No.: WO2005/096678

PCT Pub. Date: Oct. 13, 2005

(65) Prior Publication Data

US 2007/0194720 A1    Aug. 23, 2007

(30) Foreign Application Priority Data

Mar. 31, 2004    (JP)    ............................. 2004-105297

(51) Int. Cl.
H05B 37/02    (2006.01)
H05B 41/16    (2006.01)
(52) U.S. Cl. ........................ 315/291; 315/246; 315/362
(58) Field of Classification Search ............ 315/209 R, 315/246, 291, 307, 362
See application file for complete search history.

(56) References Cited

U.S. PATENT DOCUMENTS 4,076,977 A * 2/1978 Tsunekawa et al. ......... 250/206
6,963,175 B2 * 11/2005 Archenhold et al. ........ 315/291
2004/0183482 A1 * 9/2004 Roberts et al. ............. 315/363

FOREIGN PATENT DOCUMENTS

| JP | 58-58619 U | 4/1983 |
| JP | 02-123965 A | 5/1990 |
| JP | 63-301488 A | 12/1998 |
| JP | 11-233276 A | 8/1999 |
| JP | 2002-189522 A | 7/2002 |

* cited by examiner

Primary Examiner—Thuy Vinh Tran
(74) Attorney, Agent, or Firm—Arent Fox LLP

(57) ABSTRACT

It is an object of the invention to provide an improved illumination control circuit comprising a light emission element FL, a driving element 5 for driving the light emission element FL, and a compensation unit 8 are connected in series with respect to a power source voltage Vcc. Further, a reference unit 6 for generating a constant voltage Vz and a detecting unit 7 are connected in series with respect to the power source voltage Vcc. The detecting unit 7 is provided for detecting a differential voltage V1 between the power source voltage Vcc and the constant voltage Vz. Once there is a change in the power source voltage Vcc, the detecting unit 7 detects a voltage change of the power source voltage Vcc in accordance with the differential voltage V1, generates a detection voltage V2 formed by dividing the differential voltage V1, while the compensation unit 8 generates a compensation voltage V3 following the detection voltage V2, thereby inhibiting a change of a driving voltage Vx applied between two ends of the light emission element FL and the driving element 5, in response to a change of the power source voltage Vcc.

8 Claims, 5 Drawing Sheets

ILLUMINATION CONTROL CIRCUIT

CROSS-REFERENCE TO RELATED APPLICATION

This application is a National Stage entry of International Application No. PCT/JP2005/005948, filed Mar. 29, 2005, claiming the priority benefit of Japan Application No. 2004-105297 filed on Mar. 31, 2004; the entire specification claims and drawings of which are incorporated herewith by reference.

TECHNICAL FIELD

The present invention relates to an illumination control circuit which controls so-called brightness such as an illuminance and a light intensity of an illuminating lamp, a light emitting lamp, and a light emission element or the like.

TECHNICAL BACKGROUND

Japanese Unexamined Patent Application Publication No. Hei 11-233276 has disclosed an illumination control circuit (an illumination adjustment circuit) which drives an illuminating lamp for illuminating car audio device and adjusts its illuminance.

As shown in FIG. 1 of the above-mentioned patent document, the illumination adjustment circuit comprises a resistor (R1) and a zener diode (D1) connected in series with a power supply (Vcc), a switching transistor (Q2) which carries out a switching operation in accordance with a PWM signal (P), a filter circuit formed of resistors (R1, R2) and a capacitor (C1), a driving transistor (Q1) serving as a driving element for supplying a driving electric power from the power supply (Vcc) to an illuminating lamp (FL).

In the illumination adjustment circuit having the above-described structure, the switching transistor (Q2) switches a constant voltage (V2) generated in the zener diode (D1) in response to the PWM signal (P), while a switching output is smoothened by the filter circuit, thereby generating a DC voltage (VB) and determining a potential at the base of the driving transistor (Q1).

In this way, once a pulse width (W) of the PWM signal (P) is adjusted, it is possible to adjust a potential at the base of the driving transistor (Q1) and a driving electric power to be supplied to an illuminating lamp (FL), thus making it possible to adjust an illuminance of the illuminating lamp (FL).

Further, if the pulse width (W) of the PWM signal (P) is maintained at a predetermined width, the potential at the base of the driving transistor (Q1) may be maintained at a constant level by virtue of the DC voltage (VB), so that it is possible to maintain an illuminating lamp (FL) at a constant illuminance.

Patent Document 1: Japanese Unexamined Patent Application Publication No. Hei 11-233276.

DISCLOSURE OF THE INVENTION

Problem(s) to be Solved by the Invention

In the above-described conventional illumination adjustment circuit, the constant voltage (V2) generated in the zener diode (D1) is used as a reference voltage, and such a constant voltage (V2) is switched and smoothened so as to generate a DC voltage (VB) for adjusting a potential at the base of the driving transistor (Q1). As a result, it becomes possible to perform an adjustment on the illuminating lamp (FL) to ensure a constant illuminance, without being influenced by a voltage fluctuation of the power supply (Vcc).

However, when a fluctuation occurs in the power supply (Vcc) and a voltage level rises up, since the potential at the base of the driving transistor (Q1) is maintained at a constant level by virtue of the DC voltage (VB), a voltage between the collector and the base of the driving transistor (Q1) will also rise, resulting in a problem that the transistor's collector loss is large.

In particular, when driving/controlling an illuminating lamp (FL) which requires a large electric power consumption, once a voltage level of a power supply (Vcc) rises up, a load on the driving transistor (Q1) will increase, thus causing a rapid increase in the collector loss of the driving transistor (Q1), or a deterioration in the characteristic of the driving transistor (Q1), which is caused possibly due to a heat generation, hence bringing about a problem of causing a wound or the like.

The present invention has been accomplished in view of the above-discussed conventional problem and it is an object of the invention to provide an illumination control circuit having a driving element for driving an illuminating lamp, a light emitting lamp, a light emission element or the like, thereby ensuring an improved illumination control circuit capable of reducing a load on the driving element, even if there has been a fluctuation or the like on the power source voltage.

Another object of the invention is to provide an improved illumination control circuit capable of stabilizing a brightness such as an illuminance and a light intensity of an illuminating lamp, a light emitting lamp, and a light emission element or the like, even if there has been a fluctuation or the like on the power source voltage.

MEANS FOR SOLVING THE PROBLEM

An invention recited in claim 1 is an illumination control circuit for driving and controlling a light emission element, said circuit comprising: detecting means for detecting a power source voltage of a power supply and outputting a detection voltage in response to a change of the power source voltage; and a driving element and compensation means connected in series with the light emission element and the power supply, said driving element being provided for driving said light emission element and said compensation means being provided for generating a compensation voltage following the detection voltage. In particular, said compensation means, by generating a compensation voltage following the detection voltage, inhibits a change of a driving voltage applied between two ends of said light emission element and said driving element, with respect to a change in the power source voltage of said power supply.

An invention recited in claim 7 is an illumination control circuit for driving and controlling a light emission element, said circuit comprising: a driving element connected in series with the light emission element and a power supply, said driving element being provided for driving said light emission element; compensation means for supplying a control signal to the driving element; and detecting means for detecting a power source voltage of the power supply, outputting a detection voltage in response to a change of said power source voltage, and for inhibiting a level change of the control signal by adjusting the compensation means using the detection voltage.

BEST MODE OF CARRYING OUT THE INVENTION

Next, description will be given to explain two embodiments of the illumination control circuit of the present invention, with reference to FIGS. 1 to 3.

Embodiment 1

Figure 1:
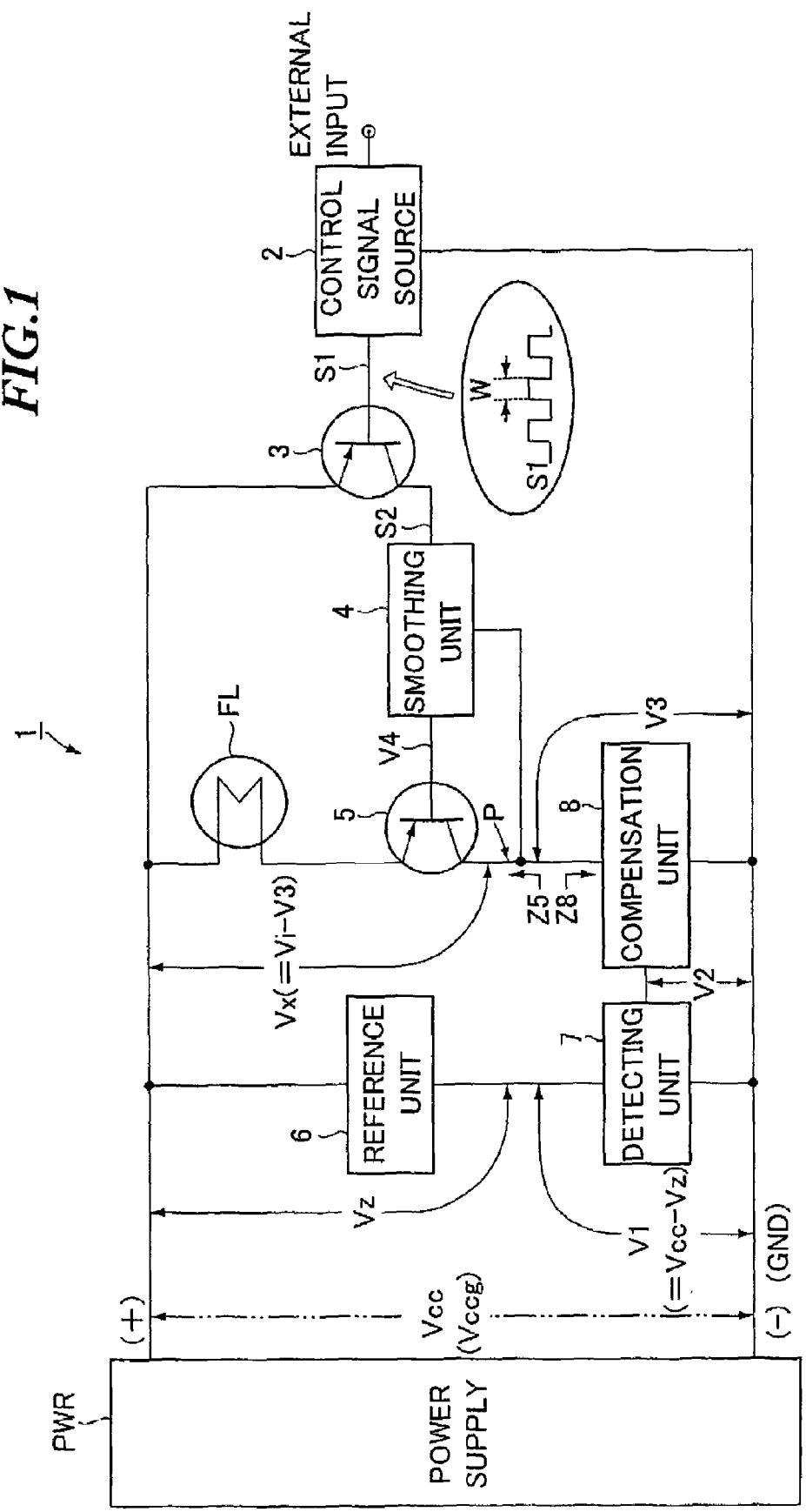
FIG. 1 is a circuit diagram showing a structure of an illumination control circuit according to a first embodiment of the present invention.

FIG. 1 is a circuit diagram showing a structure of an illumination control circuit according to a first embodiment of the present invention.

As shown in FIG. 1, the illumination control circuit 1 comprises a control signal source 2, a switching element 3 serving as a control element, a smoothing unit 4, a driving element 5, a reference unit 6, a detecting unit 7, and a compensating unit 8. When the illumination control circuit 1 is connected to a power source PWR such as a vehicle battery mounted in a vehicle, the illumination control circuit 1 will operate to control the illuminance or the light intensity of an illuminating lamp, a light emitting lamp and a light emission element FL which all receive an electric power supplied from the power source PWR and thus emit light.

In the following, for an easy description, an illuminating lamp, a light emitting lamp and a light emission element will all be simply referred to as "light emission element".

The control signal source 2 is formed of an oscillating circuit outputting PWM signal S1, and can variably adjust a pulse width (a pulse width when the signal becomes logically "H") of the PWM signal S1 by virtue of an external operation. In other words, the control signal source 2 can variably adjust the duty of the PWM signal S1 by an external operation.

The switching element 3 performs a switching operation in accordance with the PWM signal S1 and outputs a square wave switching signal S2 logically inverted with respect to the PWM signal S1.

The smoothing unit 4 is formed of a low pass filter or the like, and smoothens the switching signal S2, thereby outputting a DC voltage V4 as a control signal.

The driving element 5 is connected between the light emission element FL and the compensation circuit 8, and sets a driving electric power which causes the light emission element FL to emit a light in accordance with the DC voltage V4.

Here, in the present embodiment, a PNP transistor is used as the driving element 5, the DC voltage is applied to the base of the PNP transistor, the compensation unit 8 is connected to the collector of the PNP transistor, one input terminal of the light emission element FL is connected to the emitter of the PNP transistor, and the other input terminal of the light emission element FL is connected to the power supply PWR.

Then, since a smaller pulse width W of the PWM signal S1 will cause a larger increase in the DC voltage V4, the driving element 5 will reduce a driving electric power which causes the light emission element FL to emit a light. On the other hand, since a larger pulse width W of the PWM signal S1 will cause a larger decrease in the DC voltage V4, the driving element 5 will increase a driving electric power which causes the light emission element FL to emit a light.

The reference unit 6 and the detecting unit 7 are connected in series between the minus side output terminal (−) and the plus side output terminal (+) of the power supply PWR. Here, the reference unit 6 is formed of an electric element or an electric circuit which generates a constant voltage Vz, such as a zener diode or a constant voltage circuit.

The detecting unit 7 detects a differential voltage (Vcc−Vz) between the constant voltage Vz and the power source voltage Vcc which is higher than the constant voltage Vz outputted from the power supply PWR, and generates a detection voltage V2 represented by the following equation (1) which is an equivalent to a multiplication product of the differential voltage (Vcc−Vz) and a predetermined coefficient α. Here, the coefficient α is a positive constant value which is larger than 0 and smaller than 1.

$$V2 = \alpha(Vcc - Vz) \qquad (1)$$

For an easy description, if the minus side output terminal (−) of the power supply PWR is defined as ground (GND) terminal, a voltage V1 generated at a junction point between the reference unit 6 and the detecting unit 7 is a differential voltage (Vcc−Vz) which is a plus value with respect to (GND) terminal. Such differential voltage (Vcc−Vz) is detected by the detecting unit 7, thereby generating a detection voltage V2 represented by the above equation (1).

The compensation unit 8 is formed of an active element or an active circuit such as a transistor or an amplifier, and generates a compensation voltage V3 following the detection voltage V2 by power-amplifying the detection voltage V2, thereby setting a potential at a junction point P between the driving element 5 and the compensation unit 8 by virtue of the compensation voltage V3.

The compensation unit 8 is formed of the foregoing active element or active circuit in a manner such that an impedance when viewing the compensation unit 8 from the driving element 5 is lower then an impedance when viewing the driving element 5 from the compensation unit 8. As a result, it is possible to set a potential at a junction point P between the driving element 5 and the compensation unit 8 by virtue of the compensation voltage V3 having a lower impedance.

Here, although the compensation unit 8 of the present embodiment is constructed to generate a compensation voltage V3 higher than the detection voltage V2 by carrying out a power amplification of the detection voltage V2, it is also possible to generate a compensation voltage V3 which is equal to or lower than the detection voltage V2. Namely, the compensation unit 8 outputs a compensation voltage V3 which rises when the detection voltage V2 rises and drops when the detection voltage V2 drops.

Next, description will be given to explain basic characteristics and operation of the illumination control circuit 1, with reference to FIG. 1 and FIG. 2.

<Basic Characteristics of the Illumination Control Circuit 1>

At first, description will be given to explain basic characteristics of the illumination control circuit 1 with reference to FIG. 2.

Figure 2:
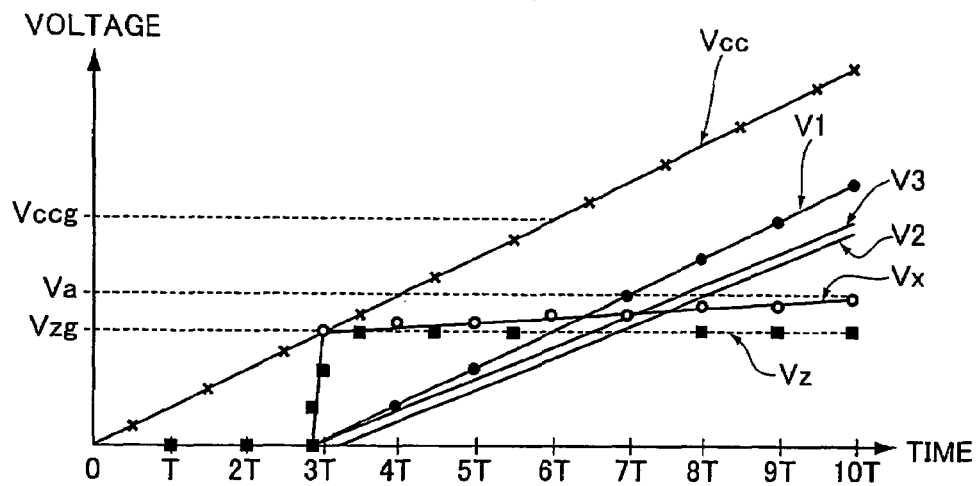
FIG. 2 provides characteristic graphs explaining basic properties of the illumination control circuit shown in FIG. 1.
Figure 2:
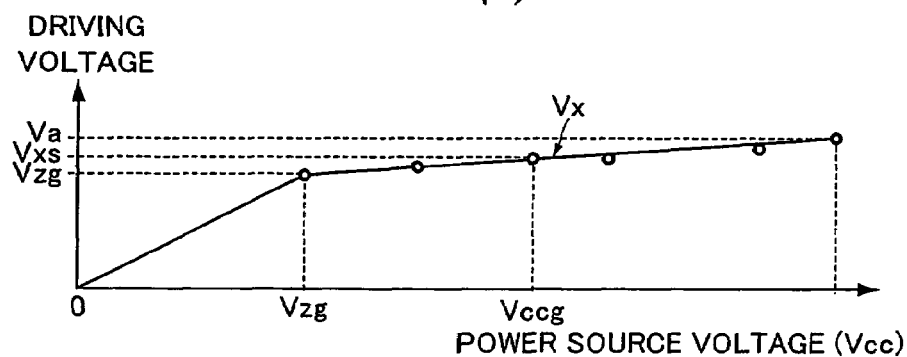
Figure 2:
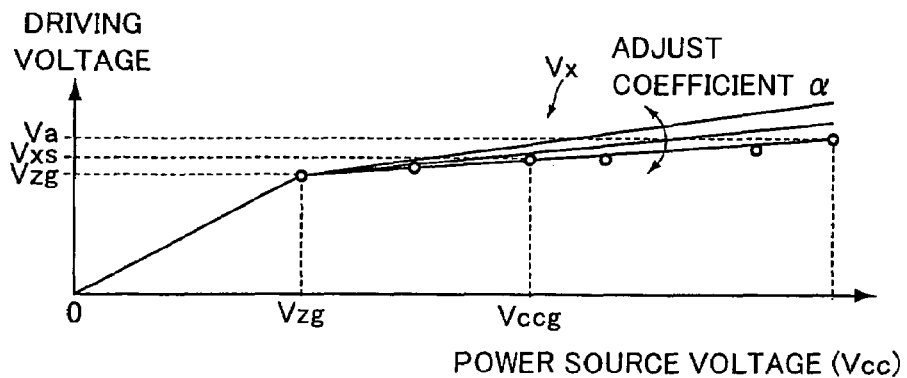

FIG. 2 shows characteristics which occur when a power source voltage Vcc gradually rises from 0 (Volt), thereby explaining basic characteristics of the illumination control circuit 1. FIG. 2(a) is a characteristic graph showing changes in a voltage Vz generated between both ends of the reference unit 6, a voltage V1 which is a differential voltage (Vcc−Vz) generated between both ends of the detecting unit 7, a detection voltage V2 outputted from the detecting unit 7, a compensation voltage V3 generated between both ends of the compensation unit 8, a driving voltage Vx generated between the light emission element FL and the driving element 5. FIG. 2(b) and FIG. 2(c) are characteristic graphs showing changes of the driving voltage Vx with respect to the power source voltage Vcc.

As shown in FIG. 2(a), when the power source voltage Vcc increases every predetermined voltage with the passing of time, since the reference unit 6 formed of a zener diode or the like will not operate within a range in which the power source voltage Vcc has not reached a predetermined voltage (such as a zener voltage) Vzg, there will not be a constant voltage Vz. On the other hand, if the power source voltage Vcc becomes equal to or higher than a predetermined voltage Vzg, there will be a constant voltage Vz which is almost equal to the voltage Vzg.

Since the voltage V1 is a differential voltage (Vcc−Vz) between the power source voltage Vcc and the constant voltage Vz, such a differential voltage will change following a change of the power source voltage Vcc within a range in which the power source voltage Vcc is equal to or higher than the voltage Vzg.

The detection voltage V2 changes following the voltage V1 within a range in which the power source voltage Vcc is equal to or higher than the voltage Vzg. Similarly, the compensation voltage V3 also changes following the voltage V1 and the detection voltage V2. On the other hand, since the detection voltage V2 changes in accordance with the above-mentioned equation (1), it changes at a voltage changing rate which is slower than the voltage changing rate of the voltage V1. Further, the compensation voltage V3 also changes at a slower voltage changing rate following the detection voltage V2.

Since the driving voltage Vx is equal to a differential voltage (Vcc−V3) between the power source voltage Vcc and the compensation voltage V3, such a driving voltage Vx will change following a change of the power source voltage Vcc.

Namely, the driving voltage Vx changes following the power source voltage Vcc within a range in which the power source voltage Vcc is equal to or higher than the voltage Vzg. On the other hand, since an increase of the power source voltage Vcc will soon cause an increase of the compensation voltage V3, the driving voltage Vx will change at a voltage changing rate which is smaller than a voltage changing rate of the power source voltage Vcc.

Furthermore, it is understood from the above equation (1) that when the coefficient α is variably adjusted, the voltage changing rate of the detection voltage V2 will also change in response to a change of the power source voltage Vcc. As a result, as shown in FIG. 2(c), there will be a change in the voltage changing rate of the driving voltage Vx which changes following the power source voltage Vcc.

Further, the illumination control circuit 1 is connected with the power supply PWR which outputs the power source voltage Vcc having a higher voltage (for example, voltage Vccg) than the constant voltage Vz (namely, voltage Vzg) generated in the reference unit 6.

Next, description will be given to explain an operation of the illumination control circuit 1 having the above-described basic characteristics.

<Operation of the Illumination Control Circuit 1 when the Power Source Voltage Vcc is Stable>

In a case where the illumination control circuit 1 is connected with the power supply PWR which outputs the power source voltage Vcc and the power source voltage Vcc is stable, once the coefficient α of the above equation (1) is set at a predetermined value, the driving voltage Vx applied between two ends of the light emission element FL and the driving element 5 will be held at the voltage Vxs corresponding to the voltage Vccg shown in FIG. 2(b).

With a driving voltage Vx kept at a constant voltage, a user can perform an external operation on the control signal source 2. Once there is an output of PWM signal S1 having an appropriate pulse width W, a switching element 3 will generate a switching signal S2 in accordance with the PWM signal S1, while the smoothing unit 4 will smoothen the switching signal S2, thereby generating a DC voltage V4 proportional to the pulse width W of the PWM signal S1. Then, the driving element 5 sets a predetermined driving electric power in response to the DC voltage V4, thereby adjusting the illuminance or the light intensity (so-called brightness) of the light emission element FL to a brightness corresponding to the pulse width W of the PWM signal S1.

Therefore, if a user or the like performs an external operation on the control signal source 2 to keep the pulse width W of the PWM signal S1 at an appropriate pulse width, it is possible to adjust the illuminance or the light intensity (so-called brightness) of the light emission element FL to a desired brightness.

Furthermore, once a user or the like performs an external operation on the control signal source 2 to keep the pulse width W of the PWM signal S1 at an appropriate pulse width, the DC voltage V4 will remain at a voltage in response to the pulse width W, thereby making it possible to maintain the light emission element FL at an illuminance or light intensity (so-called brightness) desired by a user or the like.

In addition, according to the illumination control circuit 1, when the power source voltage Vcc is stabilized at a fixed voltage, since the driving voltage Vx is also maintained at a predetermined voltage (i.e., voltage Vxs), it is possible to maintain a user's desired brightness without exerting a large load on the driving element 5, and without changing the illuminance or the light intensity (so-called brightness) of the light emission element FL.

<Operation of the Illumination Control Circuit 1 when there has Been a Fluctuation or the Like in the Power Source Voltage Vcc>

Next, description will be given to explain an operation where the power source voltage Vcc has changed. For example, in a case where the power supply PWR is a vehicle battery mounted in a vehicle, since the power supply PWR is electrically charged by an electricity generator, there will be a fluctuation such as an increase in the power source voltage Vcc.

In a case where the power source voltage Vcc goes up due to a fluctuation or the like, since the constant voltage Vz of the reference unit 6 remains at the foregoing voltage Vzg, it is understood from equation (2) that the detection voltage V2 and the compensation voltage V3 will rise with the power source voltage Vcc, and the driving voltage Vx will also rise following the power source voltage Vcc. On the other hand, as shown in FIG. 2(b), the driving voltage Vx will also change at a relatively small voltage changing rate as compared with the power source voltage Vcc, with the voltage Vxs serving as a reference.

For this reason, even if the power source voltage Vcc goes up, there would be no large load on the driving element 5, and it is possible to effect a light emission without changing the illuminance or the light intensity (so-called brightness) of the light emission element FL.

Then, when a user or the like performs an external operation on the control signal source 2 to adjust the pulse width W of the PWM signal S1, the DC voltage V4 in response to the PWM signal S1 will be applied to the driving element 5 which is biased by the driving voltage Vx having a small voltage change. As a result, the driving element 5 can cause the light emission element FL to emit a light at an illuminance or light intensity (so-called brightness) adjusted by a user or the like, thereby making it possible to effect a user's desired light emission without bringing about any irregularity to the brightness.

Namely, as shown in FIG. 2(b), when the power source voltage Vcc goes up, since the driving voltage Vx will change a little, more exactly, since there will be a change in the illuminance or the light intensity (so-called brightness) of the light emission element FL, it is possible to ensure the following effect. Namely, by adjusting in advance the coefficient α of the detecting unit 7, it is possible to reduce a voltage changing rate with respect to the power source voltage Vcc of the driving voltage Vx. In this way, it is possible to inhibit a change of the driving voltage Vx in a manner such that the illuminance or the light intensity (so-called brightness) of the light emission element FL will change only within a range which will not be felt by man's eyes. Therefore, using the illumination control circuit 1 makes it possible to effect a desired light emission without bringing about any irregularity to the illuminance or the light intensity (so-called brightness) of the light emission element FL, even if there has been an increase in the power source voltage Vcc.

Moreover, even in a case where the power source voltage Vcc drops from the voltage Vccg shown in FIG. 2(b), it is still possible to ensure the following effect, provided that the constant voltage Vz of the reference unit 6 is within a range of voltage Vzg. Namely, since a voltage change of the driving voltage Vx is small, it is possible to use the driving element 5 to effect a desired light emission without bringing about any irregularity to the illuminance or the light intensity (so-called brightness) of the light emission element FL.

For example, when the rated voltage Vccg of the power source voltage Vcc is 12 (Volt) and the constant voltage Vz generated by the reference unit 6 is 5.3 (Volt), if the power source voltage Vcc has dropped within a range from 12 (Volt) to 5.3 (Volt), since the voltage change of the driving voltage Vx is small, it is possible to use the driving element 5 to effect a desired light emission without bringing about any irregularity to the illuminance or the light intensity (so-called brightness) of the light emission element FL.

As described above, according to the illumination control circuit 1 of the present embodiment, the light emission element FL, the driving element 5, and the compensation unit 8 are connected in series with respect to the power source voltage Vcc. The detecting unit 7 detects a voltage change of the power source voltage Vcc, the compensation unit 8 generates a compensation voltage V3 which follows a change of the power source voltage Vcc, so that it is possible to reduce a change in a voltage between two ends of the light emission element FL and the driving element 5, i.e., the driving voltage Vx, even if there has been a change in the power source voltage Vcc. Further, it is possible to reduce a load on the driving element 5. Moreover, since it is possible to reduce a change of the driving voltage Vx, it is possible to stabilize the illuminance or the light intensity (so-called brightness) of the light emission element FL.

Furthermore, the reference unit 6 and the detecting unit 7 are provided with respect to the power source voltage Vcc, the detecting unit 7 detects a change in the power source voltage Vcc in accordance with the differential voltage (Vcc–Vz) between the power source voltage Vcc and the constant voltage Vz generated in the reference unit 6, while the compensation unit 8 generates the compensation voltage V3 in accordance with the detection result (detection voltage) V2, so that it is possible to reduce a change in the driving voltage Vx between two ends of the light emission element FL and the driving element 5, even if the power source voltage Vcc has become higher than the so-called rated voltage Vccg. Besides, it is possible to reduce a load on the driving element 5, and to stabilize the illuminance or the light intensity (so-called brightness) of the light emission element FL. In addition, even when the power source voltage Vcc becomes lower than the so-called rated voltage Vccg, within a range from the rated voltage Vccg to the constant voltage Vz it is possible to reduce a change in the driving voltage Vx between two ends of the light emission element FL and the driving element 5, thereby alleviating a load on the driving element 5 and stabilizing the illuminance or the light intensity (so-called brightness) of the light emission element FL.

Furthermore, since the detection voltage V2 outputted from the detecting unit 7 with respect to a change of the power source voltage Vcc can be variably adjusted by virtue of the coefficient α of the above equation (1), it is possible to adjust the driving voltage Vx with respect to the power source voltage Vcc. For example, it is possible to perform an adjustment to inhibit a change of the driving voltage Vx, corresponding to an actual changing characteristic of the power source voltage Vcc.

For this reason, even in a case where various different power supplies PWR having different power source voltages Vcc and different changes are used to control the illuminance or the light intensity of the light emission element FL, it is possible to obtain an advantage of adjusting a change of the driving voltage Vx in accordance with the characteristic of the power supply PWR.

Embodiment 2

Next, description will be given to explain an illumination control circuit formed according to a second embodiment of the present invention, with reference to FIG. 3. Here, FIG. 3 is a circuit diagram showing a structure of the illumination control circuit 1 of the present embodiment, with the elements identical or equal to those in FIG. 1 being represented by the same reference numerals.

Figure 3:
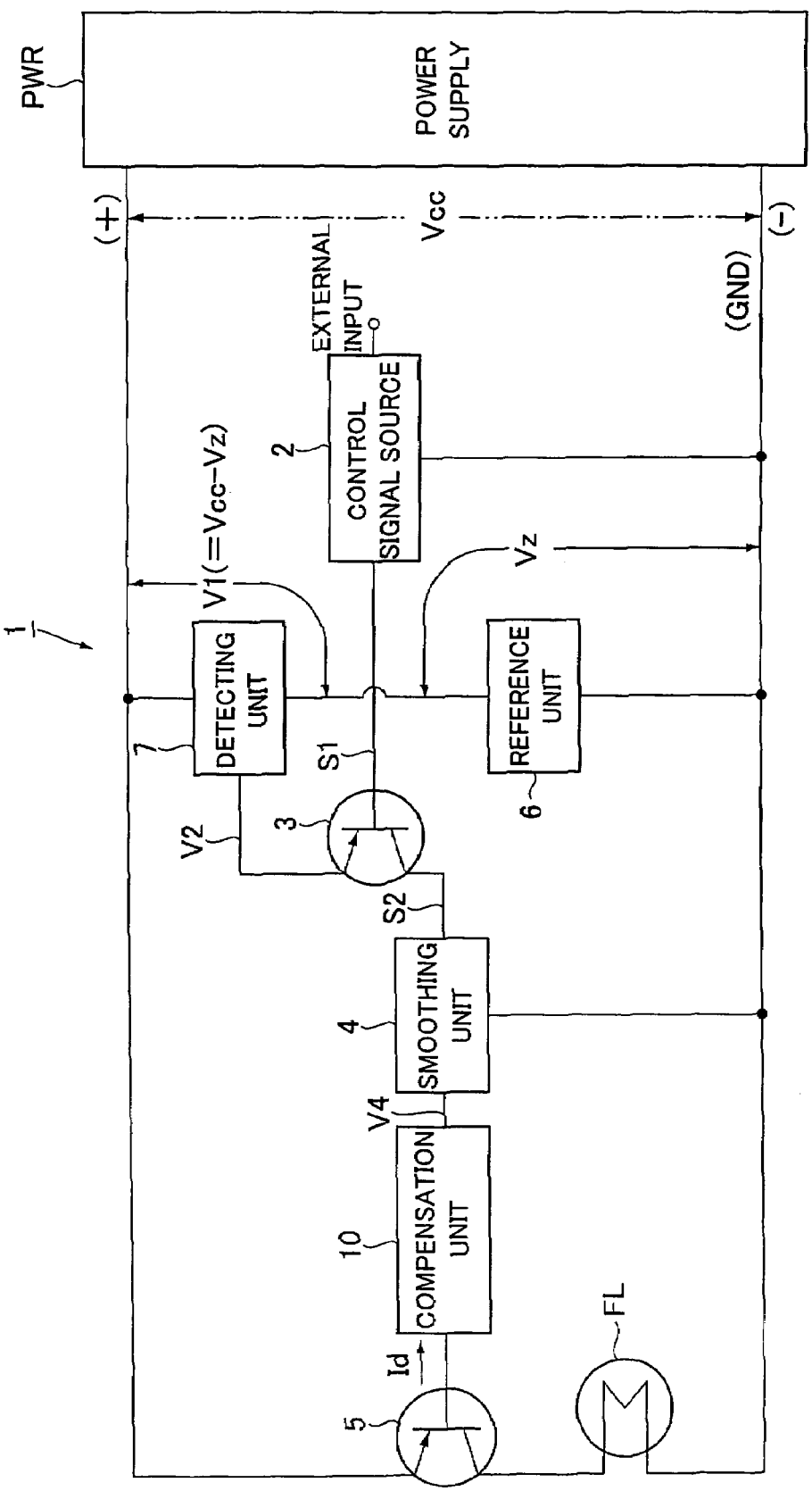
FIG. 3 is a circuit diagram showing a structure of an illumination control circuit according to a second embodiment.

As shown in FIG. 3, the illumination control circuit 1 comprises a control signal source 2, a switching element 3 serving as a control unit, a smoothing unit 4, a driving element 5, a reference unit 6, a detecting unit 7, and a compensation unit 10.

Similar to the first embodiment shown in FIG. 1, the control signal source 2 is formed of an oscillating circuit which outputs the PWM signal S1, and capable of variably adjusting the pulse width W of the PWM signal S1 by virtue of an external operation inputted thereto.

The switching element 3 performs a switching operation in accordance with the PWM signal S1, and outputs a square wave switching signal S2.

The smoothing unit 4 is formed of a low pass filter or the like and smoothens the switching signal S2, thereby generating a DC voltage V4 as a control signal in response to the above-mentioned pulse width W. In fact, a smaller pulse width W of the PWM signal S1 will induce a larger increase in the DC voltage V4 and a larger pulse width W of the PWM signal S1 will cause a larger decrease in the DC voltage V4.

The compensation unit 10 sets up the control current Id for operating the driving element 5 in accordance with the DC voltage V4.

The driving element 5 and the light emission element FL are connected in series between the plus side output terminal (+) and the minus side output terminal (−) of the power supply PWR, while the driving element 5 operates to set a driving electric power which causes the light emission element FL to emit a light in accordance with the control current Id.

Here, in the present embodiment, the driving element 5 is formed of a PNP transistor, the emitter of the PNP transistor is connected to the plus side output terminal (+) of the power supply PWR, the collector thereof is connected to the light emission element FL, while the base of the transistor is connected to the compensation unit 10 and controlled by the control current Id.

The compensation unit 10 is provided such that once the DC voltage V4 increases, the compensation unit 10 will increase the control current Id, so as to increase the base current (in other words, a suction current) of the PNP transistor. On the other hand, once the DC voltage V4 decreases, the compensation unit 10 will reduce the control current Id, thereby reducing the base current of the PNP transistor. In this way, the driving element (PNP transistor) 5 operates in a manner such that once DC voltage V4 increases, the driving element will increase the driving electric power which causes the light emission element FL to emit a light. On the other hand, once the DC voltage V4 decreases, the driving element 5 will reduce the driving electric power which causes the light emission element FL to emit a light.

The reference unit 6 and the detecting unit 7 are connected in series between the plus side output terminal (+) and the minus side output terminal (−) of the power supply PWR. The reference unit 6 is formed of an electronic element or an electronic circuitry which generates the constant voltage Vz, such as a zener diode and a constant voltage circuit, and generates a constant voltage Vz which is smaller than the power source voltage Vcc.

The detecting unit 7 detects a differential voltage (Vcc−Vz) between the power source voltage Vcc and the constant voltage Vz of the power supply PWR, thereby generating a detection voltage V2 expressed in the following equation (2), between the junction point between the detecting unit 7 and the switching element 3 on one hand and the minus side output terminal (−) of the power supply PWR on the other. Here, the coefficient β is a positive constant value which is larger than 0 and smaller than 1.

$$V2=\beta \times (Vcc-Vz)+Vz \qquad (2)$$

Namely, the detecting unit 7 generates, as the detection voltage V2, a voltage formed by adding the constant voltage Vz to a voltage which is β×(Vcc−Vz) formed by multiplying the differential voltage (Vcc−Vz) with the coefficient β.

Then, the detecting unit 7 sets an emitter potential of the switching element 3 consisting of PNP transistor by virtue of the detection voltage V2.

Next, description will be given to explain an operation of the illumination control circuit 1 having the above-described structure.

At first, description will be given to explain an operation of the illumination control circuit 1 under a constant condition without any change in the power source voltage Vcc.

The reference unit 6 generates the constant voltage Vz, and the detecting unit 7 sets an emitter potential of the switching element 3 consisting of PNP transistor, in accordance with the foregoing differential voltage (Vcc−Vz) and the detection voltage V2. Furthermore, under a constant condition without any change in the power source voltage Vcc, the detection voltage V2 remains at a constant voltage, and the emitter potential of the switching element 3 consisting of PNP transistor is also held at a constant voltage by virtue of the detection voltage V2.

Under the above-described condition, a user or the like performs an external operation on the control signal source 2. Once there is an output of the PWM signal S1 having an appropriate pulse width W, the switching element 3 will generate the switching signal S2 according to the PWM signal S1, while the smoothing unit 4 will generate DC voltage V4 in accordance with the switching signal S2.

The driving element 5 sets a predetermined driving electric power in response to the DC voltage V4, and adjusts the illuminance or the light intensity (so-called brightness) of the light emission element FL to a brightness in response to the pulse width W of the PWM signal S1.

Therefore, when a user or the like performs an external operation on the control signal source 2 to adjust the pulse width W of the PWM signal S1 in order to lower the DC voltage V4, the power amplification rate of the driving element 5 will decrease, making it possible to reduce the illuminance or the light intensity (so-called brightness) of the light emission element FL. On the other hand, upon adjusting the pulse width W of the PWM signal S1 in order to increase the DC voltage V4, the power amplification rate of the driving element 5 will increase, making it possible to increase the illuminance or the light intensity (so-called brightness) of the light emission element FL.

Moreover, when a user or the like performs an external operation on the control signal source 2 to maintain the pulse width W of the PWM signal S1 at an appropriate pulse width, the DC voltage V4 will remain at a voltage in response to the foregoing pulse width, thereby rendering it possible to maintain the illuminance or the light intensity (so-called brightness) of the light emission element FL at a desired brightness.

Next, description will be given to explain an operation of the illumination control circuit 1 in a case where the power source voltage Vcc has changed due to a voltage fluctuation.

When the power source voltage Vcc of the power supply PWR goes up due to a voltage fluctuation or the like, the reference unit 6 will generate a constant voltage Vz irrespective of a change in the power source voltage Vcc. Further, according to the above equation (2), the detecting unit 7 generates a detection voltage V2 from the foregoing differential voltage (Vcc−Vz).

Here, since the constant voltage Vz does not change even if there is a fluctuation in the power source voltage Vcc, the differential voltage (Vcc−Vz) will rise with an increase in the power source voltage Vcc, while the detecting unit 7 detects an increase in the differential voltage (Vi−Vz) and outputs a detection voltage V2 which goes up due to an increase in the power source voltage Vcc.

In this way, if the detection voltage V2 rises with the rise of the power source voltage Vcc, a voltage between the emitter and the base of the switching element 3 consisting of PNP transistor will become large, and the voltage amplification factor of the switching element 3 will also become large.

Then, once the voltage amplification factor of the switching element 3 becomes large, the amplitude of the switching signal S2 will also become large, the voltage level of the DC voltage V4 outputted from the smoothing unit 4 will go up, thereby increasing a driving electric power supplied to the light emission element FL by the driving element 5 consisting of the PNP transistor.

Here, an important point which should be noted is that when the power source voltage Vcc goes up due to a fluctuation or the like, the detection voltage V2 will rise depending on the coefficient β of the above equation (2), so that the voltage amplification factor of the detection voltage V2 becomes gentle (small) as compared with the voltage changing rate of the power source voltage Vcc. For this reason, although the voltage between the emitter and the base of the switching element 3 becomes large with the rise of the power source voltage Vcc, such a voltage will also become large at a voltage changing rate which is smaller than the voltage changing rate of the power source voltage Vcc, under a constitution in which the voltage amplification rate of the switching element 3 has been inhibited.

Therefore, the amplitude of the switching signal S2 becomes large in accordance the voltage amplification factor of the controlled switching element 3. The voltage level of the DC voltage V4 outputted from the smoothing unit 4 goes up also in accordance with the voltage amplification factor of the controlled switching element 3. Further, the power amplification of the driving element 5 consisting of PNP transistor will also increase in accordance with the voltage amplification factor of the controlled switching element 3, with no significant change in the driving electric power supplied to the light emission element FL. For this reason, there would be no significant change in the illuminance or the light intensity (so-called brightness) of the light emission element FL, with any change remaining within a range in which there is not any irregularity in the brightness.

Moreover, even in a case where the power source voltage Vcc has dropped, if the power source voltage Vcc drops from the rated voltage to a range in which the reference unit 6 generates the constant voltage Vz, it is still possible to ensure a bias voltage between the emitter and the base of the switching element 3 consisting of PNP transistor, by virtue of the detection voltage V2. Further, since the detection voltage V2 drops depending on the coefficient β of the above equation (2), the voltage amplification factor of the detection voltage V2 will become gentle (small) as compared with the voltage changing rate of the power source voltage Vcc.

For this reason, although a voltage between the emitter and the base of the switching element 3 becomes small with the dropping of the power source voltage Vcc, such a voltage will decrease at a voltage changing rate smaller than the voltage changing rate of the power source voltage Vcc, the voltage amplification factor of the switching element 3 will drop in an inhibited state, the electric power amplification factor of the driving element 5 consisting of PNP transistor will also decrease in response to the voltage amplification factor of the controlled switching element 3, without any considerable change in the driving electric power being supplied to the light emission element FL. Accordingly, even when the power source voltage Vcc has decreased, there would be no considerable change in the illuminance or the light intensity (so-called brightness) of the light emission element FL, with any change remaining within a range in which there is not any irregularity in the brightness.

As explained above, according to the illumination control circuit 1 of the present embodiment, even when there has been a fluctuation or the like in the power source voltage Vcc, it is still possible to use the reference unit 6 and the detecting unit 7 to adjust the DC voltage V4 and the control current Id in a manner such that the load on the driving element 5 will not become large. Further, it is also possible to stabilize the illuminance or the light intensity (so-called brightness) of the light emission element FL.

Moreover, since a change in the power source voltage Vcc will soon cause a change in the detection voltage V2, the voltage amplification factor of the switching element 3 will also change and DC voltage V4 will also change. As a result, although there will be a change in the illuminance or the light intensity (so-called brightness) of the light emission element FL, if the coefficient β of the detecting unit 7 is adjusted in advance, it is possible to reduce a voltage changing rate with respect to the power source voltage Vcc of the detection voltage V2, making it possible to reduce a change in the DC voltage V4, in a manner such that the illuminance or the light intensity (so-called brightness) of the light emission element FL changes only within a range which will not be felt by man's eyes. Furthermore, since it is possible to reduce a fluctuation of the DC voltage V4, it is possible to stabilize the illuminance or the light intensity (so-called brightness) of the light emission element FL.

Furthermore, since it has become possible to use the coefficient β shown in the foregoing equation (2) to variably adjust a change in the detection voltage V2 outputted from the detecting unit 7 with respect to a change in the power source voltage Vcc, it is possible to perform an adjustment to inhibit a change in the DC voltage V4 and the control current Id, corresponding to an actual changing characteristic of the power source voltage Vcc. For this reason, even in a case where the illuminance or the light intensity of the light emission element FL is controlled using various power supplies PWR having different power source voltages Vcc and voltage fluctuations, it is still possible to obtain an advantage of performing an adjustment to inhibit a change of the DC voltage V4 in response to the characteristic of the power supply PWR.

EXAMPLE 1

Next, with reference to FIG. 4, description will be given to explain in more detail an example of the illumination control circuit 1 formed according to the first embodiment of the present invention.

Figure 4:
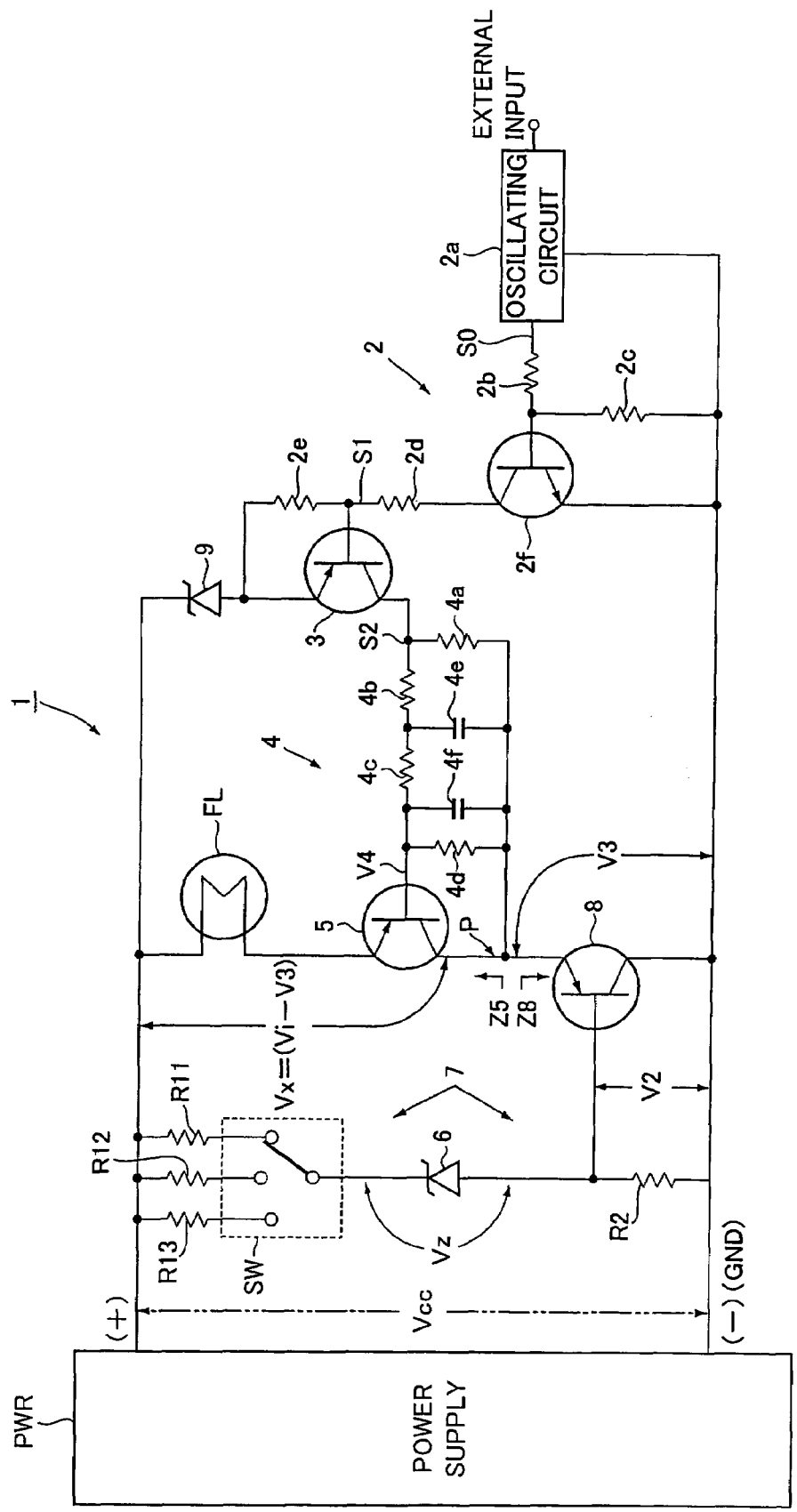
FIG. 4 is a circuit diagram showing a structure of an illumination control circuit according to a first example.

FIG. 4 is a circuit diagram showing a structure of the illumination control circuit of the present embodiment, with elements identical or equal to those in FIG. 1 being represented by the same reference numerals.

As shown in FIG. 4, similar to the illumination control circuit of the embodiment shown in FIG. 1, this illumination control circuit 1 comprises: a control signal source 2, a switching element 3, a smoothing unit 4, a driving element 5, a reference unit 6, a detecting unit 7, and a compensation unit 8.

The control signal source 2 comprises an oscillating circuit 2a outputting PWM signal S0, NPN transistor 2f, and bias resistors 2b-2e. The NPN transistor 2f invert-amplifies the PWM signal S0. The invert-amplified PWM signal S1 is then supplied to the base of the switching element 3.

The switching element 3 is formed of PNP transistor, its emitter is connected to the plus side output terminal (+) of the power supply PWR through the zener diode 9, while its collector is connected to the smoothing unit 4. Then, by performing a switching operation in accordance with the PWM signal S1 supplied to the base of the PNP transistor, it is possible to output a square wave switching signal S2.

The smoothing unit 4 is a n type low pass filter formed of resistors 4a-4d and capacitors 4e, 4f and generates DC voltage V4 by smoothing the switching signal S2.

The driving element 5 is formed of PNP transistor 5, its emitter is connected to the plus side output terminal (+) of the power supply PWR through the light emission element FL, while its collector is connected to the compensation unit 8, with the DC voltage V4 applied to the base thereof.

The compensation unit 8 is formed of PNP transistor 8 connected between the collector of the PNP transistor 5 and the minus side output terminal (−) of the power supply PWR, with its collector connected to the minus side output terminal (−) and its emitter connected to the collector of the PNP transistor 5, respectively.

The reference unit 6 is formed of the zener diode 6 for generating the constant voltage Vz, so as to generate the constant voltage Vz which is smaller than the power source voltage Vcc.

The detecting unit 7 comprises a plurality of resistors R11-R13, a changeover switch SW and a resistor R2 connected in series with the zener diode 6 between the plus side output terminal (+) and the minus side output terminal (−) of the power supply PWR. By performing a changeover operation on the changeover switch SW, it is possible to connect any one of the resistors R11-R13 between the plus side output terminal (+) of the power supply PWR on one hand and the zener diode 6 on the other.

Moreover, with regard to the resistors R11-R13, the resistor R11 has the smallest resistance, the resistor R12 has a relatively large resistance, and the resistor R13 has the largest resistance. Further, the resistor R12 is formed of a constant resistor having a predetermined resistance value.

Then, once the changeover switch SW is switched over to the resistor R11 side, the resistors R11 and R2 will divide a differential voltage (Vcc−Vz) of the power source voltage Vcc and the constant voltage Vz, thereby generating a detection voltage V2 across the resistor R2 in accordance with a relation expressed by the following equation (3).

$$V2=(Vcc-Vz) \times R2/(R11+R2)=\alpha 1 \times (Vcc-Vz) \qquad (3)$$

Further, once the changeover switch SW is switched over to the resistor R12 side, the resistors R12 and R2 will divide a differential voltage (Vcc−Vz) of the power source voltage Vcc and the constant voltage Vz, thereby generating a detection voltage V2 across the resistor R2 in accordance with a relation expressed by the following equation (4).

$$V2=(Vcc-Vz) \times R2/(R12+R2)=\alpha 2 \times (Vcc-Vz) \qquad (4)$$

Moreover, once the changeover switch SW is switched over to the resistor R13 side, the resistors R13 and R2 will divide a differential voltage (Vcc−Vz) of the power source voltage Vcc and the constant voltage Vz, thereby generating a detection voltage V2 across the resistor R2 in accordance with a relation expressed by the following equation (5).

$$V2=(Vcc-Vz) \times R2/(R13+R2)=\alpha 3 \times (Vcc-Vz) \qquad (5)$$

However, the coefficients α1, α2, and α3 in the above equations (3), (4), and (5) represent partial voltage ratios based on the resistors R11, R12, and R13 and the constant resistor R2, and are equivalent to the coefficient α in the above equation (1).

The detection voltage V2 generated across the resistor R2 is applied to the base of the PNP transistor 8 forming the compensation unit 8, thereby generating a compensation voltage V3 between the emitter and the collector of the PNP transistor 8.

Next, description will be given to explain an operation of the illumination control circuit 1 of the present embodiment, with reference to FIG. 2 and FIG. 4.

First, description will be given to explain a basic operation of the illumination control circuit 1 of the present embodiment, with reference to FIG. 2(a).

The zener diode 6 generates the constant voltage Vz, the detecting unit 7 formed of the resistors R11-R13, the changeover switch SW and the resistor R2 will divide the foregoing differential voltage (Vcc−Vz), thereby generating the detection voltage V2 across the resistor R2. Then, the PNP transistor 8 power-amplifies the detection voltage V2, thereby generating the compensation voltage V3 which follows the detection voltage V2.

Namely, as described above with reference to the above-mentioned equations (3), (4), and (5), when the changeover switch SW is switched to the resistor R11 side, a detection voltage V2 will be generated in accordance with the foregoing equation (3). When the changeover switch SW is switched to the resistor R12 side, a detection voltage V2 will be generated in accordance with the foregoing equation (4). When the changeover switch SW is switched to the resistor R13 side, a detection voltage V2 will be generated in accordance with the foregoing equation (5). Then, the PNP transistor 8 power-amplifies a detection voltage V2, thereby generating the compensation voltage V3 which follows each detection voltage V2.

Furthermore, since the emitter of the PNP transistor 8 and the collector of the PNP transistor 5 are connected to each other, an impedance Z8 when viewing the emitter of the PNP transistor 8 from the PNP transistor 5 will be lower than an impedance Z5 when viewing the PNP transistor 5 from the PNP transistor 8. As a result, a potential at the junction point P between the PNP transistor 5 and the PNP transistor 8 can be determined by the compensation voltage V3, and there will be a driving voltage Vx which is equivalent to a difference between the power source voltage Vcc and the compensation voltage V3, and applied between two ends of the PNP transistor 5 and the light emission element FL.

Furthermore, when the power source voltage Vcc is kept constant without any change, the detection voltage V2 and the compensation voltage V3 can also be kept constant, thereby maintaining the driving voltage Vx at the above-mentioned voltage (Vcc−V3).

Under the above-described condition, once a user or the like performs an external operation on the oscillating circuit 2a to output PWM signal S0 having an appropriate pulse width W, the NPN transistor 2f will generate PWM signal S1 formed by invert-amplifying the PWM signal S0, and supply the same to the base of the switching element 3. Then, the switching element 3 generates a switching signal S2 according to the PWM signal S1, the smoothing unit 4 generates a DC voltage V4 in accordance with the switching signal S2, and the PNP transistor 5 sets up a predetermined driving electric power in response to the DC voltage V4, thereby adjusting the illuminance or the light intensity (so-called brightness) of the light emission element FL to a desired brightness in response to the pulse width W of the PWM signal S1.

Therefore, once a user or the like performs an external operation on the oscillating circuit 2a to properly adjust the pulse width W of the PWM signal S0, it is possible to adjust the illuminance or the light intensity (so-called brightness) of the light emission element FL to a desired brightness.

Furthermore, once a user or the like performs an external operation on the oscillating circuit 2a to properly maintain the pulse width W of the PWM signal S0 at an appropriate pulse width, the DC voltage V4 will remain at a voltage in response to its pulse width W, thereby maintaining the light emission element FL at an illuminance or a light intensity (so-called brightness) desired by a user or the like.

Furthermore, according to the illumination control unit 1 of the present embodiment, when the power source voltage Vcc has been stabilized at a constant voltage, since the driving voltage Vx is also maintained at a predetermined value, it is possible to avoid a large load on the PNP transistor 5, thereby maintaining the illuminance or the light intensity (so-called brightness) of the light emission element FL at a user's desired level without any change.

Next, description will be given to explain an operation of the illumination control circuit 1 when the power source voltage Vcc of the power supply PWR has changed due to a fluctuation or the like.

When the power source voltage Vcc of the power supply PWR has gone up due to a fluctuation or the like, a constant voltage Vz will occur across the zener diode 6 without being affected by any change of the power source voltage Vcc. As a result, as described above with reference to the foregoing equations (3), (4), and (5), when the changeover switch SW is switched to the resistor R11 side, a detection voltage V2 will rise in accordance with the foregoing equation (3). When the changeover switch SW is switched to the resistor R12 side, a detection voltage V2 will rise in accordance with the foregoing equation (4). When the changeover switch SW is switched to the resistor R13 side, a detection voltage V2 will rise in accordance with the foregoing equation (5). Then, the PNP transistor 8 power-amplifies a detection voltage V2, thereby generating a compensation voltage V3 which follows each detection voltage V2.

Then, once the power source voltage Vcc goes up under a condition in which any one of the resistors R11, R12, and R13 has been switched so as to be selected by virtue of the changeover switch SW, the driving voltage Vx applied between the light emission element FL and the PNP transistor 5 will change with the rising of the compensation voltage V3, in a manner as shown in FIG. 2(b).

Here, since the driving voltage Vx is a voltage (Vcc−V3) formed by deducting the compensation voltage V3 from the power source voltage Vcc, a rise in the power source voltage Vcc will cause a rise in the compensation voltage V3. Therefore, the voltage (Vcc−V3), i.e., the driving voltage Vx will not have a significant change. For this reason, it is possible to maintain a condition in which there is not a large load exerted on the driving element 5.

Under the above-described condition, once a user or the like performs an external operation on the oscillating circuit 2a and the PWM signal S0 having an appropriate width W is outputted and kept at a pulse width W of an earlier time at which the power source voltage Vcc has not changed, the following operations will occur. Namely, the switching element 3 generates the switching signal S2 according to the PWM signal S1 formed by invert-amplifying the PWM signal S0, the smoothing unit 4 generates DC voltage V4 in accordance with the switching signal S2, and the PNP transistor 5 sets up a predetermined driving electric power in response to the DC voltage V4, thereby adjusting the illuminance or the light intensity (so-called brightness) of the light emission element FL to a desired brightness in response to the pulse width W of the PWM signal S1.

Namely, even in a case where the power source voltage Vcc has changed, there would be no significant change in the driving voltage Vx which is equivalent to a difference between the power source voltage Vcc and the compensation voltage V3. As a result, it is possible to cause the light emission element FL to emit a light at an illuminance or a light intensity (so-called brightness) desired by a user or the like, in response to the pulse width W of the PWM signal S0.

As described above, according to the illumination control circuit 1 of the present embodiment, the light emission element FL and the PNP transistors 5, 8 are connected in series with respect to the power source voltage Vcc, the detecting unit 7 detects a voltage fluctuation of the power source voltage Vcc, while the PNP transistor 8 generates a compensation voltage V3 which follows a change of the power source voltage Vcc. As a result, even when there is a change in the power source voltage Vcc, it is still possible to reduce a fluctuation of a voltage, i.e., a driving voltage Vx between the light emission element FL and the PNP transistor 5, thereby reducing a load on the PNP transistor 5. Further, since it is possible to reduce an undesired fluctuation in the driving voltage Vx, it is possible to stabilize the illuminance or the light intensity (so-called brightness) of the light emission element FL.

Furthermore, the zener diode 6 and the detecting unit 7 are provided with respect to the power source voltage Vcc, while the detecting unit 7 detects a change in the power source voltage Vcc in accordance with the differential voltage (Vcc−Vz) between the power source voltage Vcc and the constant voltage Vz generated in the zener diode 6, with the PNP transistor 8 generating the compensation voltage V3 in accordance with the detection result (detection voltage) V2. As a result, even when the power source voltage Vcc becomes higher than the so-called rated voltage, it is still possible to reduce a fluctuation of the driving voltage Vx between two ends of the light emission element FL and the PNP transistor 5, thereby reducing a load on the PNP transistor 5 and stabilizing the illuminance or the light intensity (so-called brightness) of the light emission element FL. Moreover, even when the power source voltage Vcc becomes lower than the so-called rated voltage, within a range from the rated voltage to the constant voltage Vz, it is still possible to reduce a fluctuation of the driving voltage Vx between two ends of the light emission element FL and the PNP transistor 5, thereby reducing a load on the PNP transistor 5 and stabilizing the illuminance or the light intensity (so-called brightness) of the light emission element FL.

Furthermore, since it has become possible to use the changeover switch SW to variably adjust a change of the detection voltage V2 outputted from the detecting unit 7 with respect to a change of the power source voltage Vcc, it is possible to adjust the driving voltage Vx with respect to a change of the power source voltage Vcc in a manner shown in FIG. 2(c). For example, it is possible to perform an adjustment to inhibit a fluctuation of the driving voltage Vx, corresponding to an actual changing characteristic of the power source voltage Vcc.

For this reason, even when using various types of power supplies PWR having different power source voltages Vcc and different voltage fluctuations to control the illuminance or the light intensity of the light emission element FL, it is still possible to perform an adjustment to inhibit a fluctuation of the driving voltage Vx in accordance with a characteristic of the power supply PWR.

Next, description will be given to explain in more detail an example of an illumination control circuit according to a second embodiment of the present invention, with reference to FIG. 5.

Figure 5:
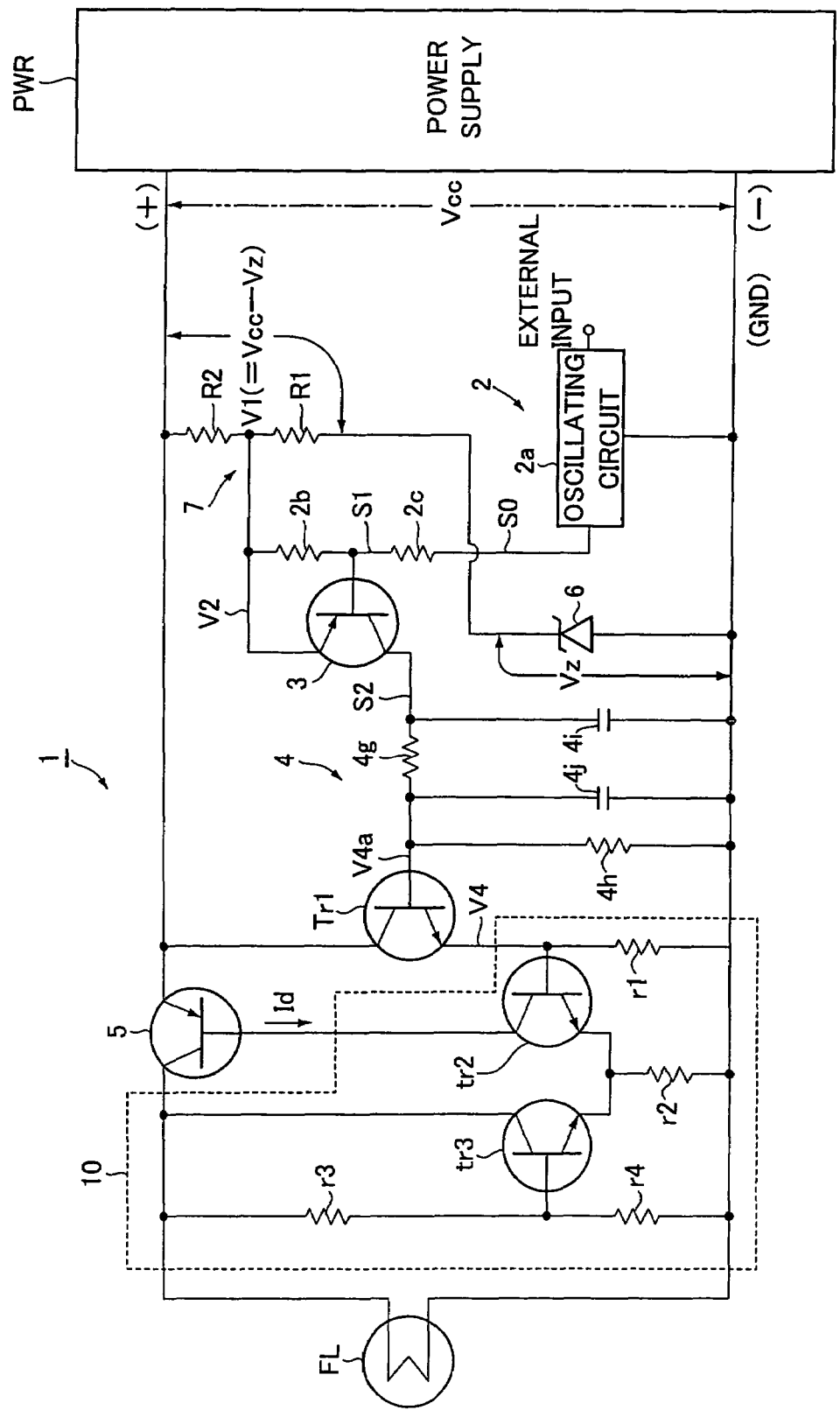
FIG. 5 is a circuit diagram showing a structure of an illumination control circuit according to a second example.

FIG. 5 is a circuit diagram showing a structure of the illumination control circuit of the present embodiment, with elements identical or equal to those in FIG. 3 being represented by the same reference numerals.

As shown in FIG. 5, similar to the illumination control circuit of the embodiment shown in FIG. 3, this illumination control circuit 1 comprises: a control signal source 2, a switching element 3, a smoothing unit 4, a driving element 5, a reference unit 6, a detecting unit 7, and a compensation unit 10.

The control signal source 2 comprises an oscillating circuit 2a which outputs the PWM signal S0, as well as resistors 2b, 2c for biasing the switching element 3, and divides the PWM signal S0 outputted from the oscillating circuit 2a into PWM signal S1 by virtue of the resistors 2b, 2c and supplies the same to the base of the switching element 3.

The switching element 3 is formed of PNP transistor, its emitter is connected to the plus side output terminal (+) of the power supply PWR, while its collector is connected to the smoothing unit 4. Then, by performing a switching operation in accordance with the PWM signal S1 supplied to the base of the PNP transistor, it is possible to output a square wave switching signal S2.

The smoothing unit 4 is a n type low pass filter formed of resistors 4g-4h and an NPN transistor Tr1. Resistors 4g-4h and capacitors 4i, 4j generate a DC voltage V4a by smoothing the switching signal S2, while the NPN transistor Tr1 power-amplifies the DC-voltage V4a so as to generate a DC voltage V4 corresponding to the DC-voltage V4a in the emitter thereof.

The compensation unit 10 is formed of a differential amplifier circuit including NPN transistors Tr2, Tr3 and bias resistors r1-r4, while the NPN transistor Tr2 connected to the driving element 5 generates the control current Id in response to the DC voltage V4.

The driving element 5 is formed of the PNP transistor 5, its emitter is connected to the plus side output terminal (+) of the power supply PWR, its collector is connected to the minus side output terminal (−) of the power supply PWR through the light emission element FL, and its base is connected to the collector of the NPN transistor Tr2, thereby making it possible to perform an operation in accordance with the control current Id.

The reference unit 6 is formed of the zener diode 6 which generates the constant voltage Vz, as well as another constant voltage Vz which is smaller than the power source voltage Vcc.

The detecting unit 7 includes the zener diode 6 and the resistors R1, R2 connected in series between the plus side output terminal (+) and the minus side output terminal (−) of the power supply PWR. As shown in the diagram, the emitter of the switching element 3 consisting of PNP transistor as well as the resistor R2 are connected at a junction point between the resistors R1, R2.

The resistors R1 and R2, by dividing the differential voltage (Vcc−Vz) of the power source voltage Vcc and the constant voltage Vz, can generate a detection voltage V2 in accordance with the following equation (6).

$$V2 = (Vcc - Vz) \times R1/(R1 + R2) + Vz \qquad (6)$$
$$= \beta \times (Vcc - Vz) + Vz$$

Next, description will be given to explain an operation of the illumination control circuit 1 formed according to the present embodiment.

Next, description will be given to explain an operation of the illumination control circuit 1 having the above-described structure.

At first, description will be given to explain an operation of the illumination control circuit 1 in a case where the power source voltage Vcc remains constant without any change.

Namely, the reference unit 6 generates the constant voltage Vz, while the above-mentioned detecting unit 7 sets, in accordance with the differential voltage (Vcc−Vz) and by virtue of the generated detection voltage V2, an emitter potential of the switching element 3 consisting of the PNP transistor. Furthermore, in a case where the power source voltage Vcc remains constant without any change, the detection voltage V2 will become a constant voltage, so that an emitter potential of the switching element 3 consisting of the PNP transistor can be maintained at a constant voltage by virtue of the detection voltage V2.

In this state, once a user or the like performs an external operation on the oscillating circuit 2a to output the PWM signal S0 having an appropriate pulse width W, the switching element 3 will generate a switching signal S2 in accordance with the PWM signal S1, while the smoothing unit 4 will generate a DC voltage V4 in accordance with the switching signal S2.

When the NPN transistor Tr2 of the compensation unit 10 generates the control current Id in response to the DC voltage V4 and controls the operation of the PNP transistor 5, the illuminance or the light intensity (so-called brightness) of the light emission element FL can be adjusted to a brightness in response to the pulse width W of the PWM signal S0.

Therefore, once a user or the like performs an external operation on the oscillating circuit 2a to adjust the pulse width W of the PWM signal S0 in order to lower the DC voltage V4, the power amplification of the PNP transistor 5 will decline and it is possible to reduce the illuminance or the light intensity (so-called brightness) of the light emission element FL. On the other hand, upon adjusting the pulse width W of the PWM signal S0 to increase the DC voltage V4, the power amplification of the PNP transistor 5 will increase, thus making it possible to increase the illuminance or the light intensity (so-called brightness) of the light emission element FL.

Moreover, once a user or the like performs an external operation on the oscillating circuit 2a to maintain the pulse width W of the PWM signal S0 at an appropriate pulse width, the DC voltage V4 will remain at a voltage in response to the pulse width, thereby making it possible to maintain the illuminance or the light intensity (so-called brightness) of the light emission element FL at a desired brightness.

Next, description will be given to explain an operation of the illumination control circuit 1 in a case where there has been a change in the power source voltage Vcc due to a fluctuation or the like.

In a case where there has been an increase in the power source voltage Vcc of the power supply PWR due to a fluctuation or the like, the zener diode 6 will generate the constant voltage Vz irrespective of a change in the power source voltage Vcc. Further, in accordance with the above equation (6), the above-mentioned resistors R1 and R2 will generate the detection voltage V2 from the foregoing differential voltage (Vcc−Vz).

Here, since a change in the power source voltage Vcc does not cause a change in the constant voltage Vz, the differential voltage (Vcc−Vz) will rise with an increase in the power source voltage Vcc, while the resistors R1 and R2 will detect an increase in the differential voltage (Vcc−Vz), thereby outputting a detection voltage V2 which rises following an increase in the power source voltage Vcc, in accordance with the above equation (6).

In this way, if the detection voltage V2 rises with an increase in the power source voltage Vcc, a voltage between the emitter and the base of the switching element 3 consisting of PNP transistor will become large, thereby increasing a voltage amplification factor of the switching element 3.

Then, once there is an increase in the voltage amplification factor of the switching element 3, an amplitude of the switching signal S2 will become large, a voltage level of the DC voltage V4 outputted from the smoothing unit 4 will increase, and there will be an increase in the power amplification of the driving element 5 consisting of PNP transistor, thereby increasing a driving electric power to be supplied to the light emission element FL.

Here, an important point is that when there is an increase in the power source voltage Vcc due to a fluctuation or the like, the detection voltage V2 will rise depending on the coefficient β of the above equation (6). As a result, the voltage changing rate of the detection voltage V2 becomes gentler (smaller) than the voltage changing rate of the power source voltage Vcc. In this way, although a voltage between the emitter and the base of the switching element 3 becomes large with an increase in the power source voltage Vcc, it becomes large at a voltage changing rate which is smaller than the voltage changing rate of the power source voltage Vcc, i.e., becomes large under a condition in which the voltage amplification factor of the switching element 3 has been controlled.

Therefore, the amplitude of the switching signal S2 becomes large in accordance with the voltage amplification factor of the controlled switching element 3, and the voltage level of the DC voltage V4 outputted from the smoothing unit 4 also goes up according to the voltage amplification factor of the controlled switching element 3. Further, the power amplification of the PNP transistor 5 will also increase in accordance with the voltage amplification factor of the controlled switching element 3, while the driving electric power supplied to the light emission element FL will not have a significant change.

For this reason, there will not be any significant change in the illuminance or the light intensity (so-called brightness) of the light emission element FL. Even if a change occurs, such a change will be controlled within a range which does not involve a brightness irregularity.

Moreover, even in a case where the power source voltage Vcc has dropped, if the power source voltage Vcc drops from a rated voltage into a range where the reference unit 6 generates the constant voltage Vz, it is possible ensure, by virtue of the detection voltage V2, a bias voltage between the emitter and the base of the switching element 3 consisting of the PNP transistor. Besides, the detection voltage V2 will drop depending on the coefficient β of the above equation (6). As a result, the voltage changing rate of the detection voltage V2 will become gentler (smaller) than the voltage changing rate of the power source voltage Vcc.

In this way, even though a voltage between the emitter and the base of the switching element 3 decreases with a decrease of the power source voltage Vcc, such a decrease will happen at a voltage changing rate which is smaller than the voltage changing rate of the power source voltage Vcc, the voltage amplification factor of the switching element 3 will become small in a controlled state, the power amplification of the PNP transistor 5 will also decrease according to the voltage amplification factor of the controlled switching element 3, with no significant change in the driving electric power supplied to the light emission element FL. For this reason, even if the power source voltage Vcc has dropped, there would be no significant change in the illuminance or the light intensity (so-called brightness) of the light emission element FL, thereby ensuring an effect that any change remains within a range not involving a brightness irregularity.

As described above, according to the illumination control circuit 1 of the present embodiment, even if there has been a fluctuation or the like in the power source voltage Vcc, it is still possible to adjust the DC voltage V4 to avoid an increased load on the PNP transistor 5 by virtue of the zener diode 6 and resistors R1, R2, thereby stabilizing the illuminance or the light intensity (so-called brightness) of the light emission element FL.

Moreover, since a change in the power source voltage Vcc will soon cause a change in the detection voltage V2, the voltage amplification factor of the switching element 3 will change and the DC voltage V4 will also change. As a result, if explained more exactly, although there will be a change in the illuminance or the light intensity (so-called brightness) of the light emission element FL, it is still possible to reduce a voltage changing rate with respect to the power source voltage Vcc of the detection voltage V2 by adjusting in advance the coefficient β of the detecting unit 7. Further, it is possible to reduce a fluctuation of the DC voltage V4 in a manner such that the illuminance or the light intensity (so-called brightness) of the light emission element FL changes only within a range which will not be felt by man's eyes. Furthermore, since it is possible to reduce the fluctuation of the DC voltage V4, it is possible to stabilize the illuminance or the light intensity (so-called brightness) of the light emission element FL.

Furthermore, since it has been possible to variably adjust, by virtue of the coefficient β of the above equation (6), a change of the detection voltage V2 with respect to the power source voltage Vcc, it is possible to perform an adjustment to inhibit a fluctuation of the DC voltage V4, corresponding to an actual changing characteristic of the power source voltage Vcc. In this way, even in a case where various power supplies PWR having different power source voltages Vcc and different voltage fluctuations are used to control the illuminance or the light intensity of the light emission element FL, it is still possible to obtain an advantage of performing an adjustment to inhibit a fluctuation of the DC voltage V4, in response to the characteristic of the power supply PWR.

The invention claimed is:
1. An illumination control circuit for driving and controlling a light emission element, said circuit comprising:
   a generating device for generating a control signal of DC voltage for setting a brightness of the light emission element;

a driving transistor connected in series with the light emission element and a power supply, for supplying a driving electric power from the power supply to the light emission element in accordance with said control signal, thereby causing the light emission element to emit a light;

a detecting device for detecting a differential voltage between a power source voltage of the power supply and a predetermined reference voltage, dividing the differential voltage with an adjustable coefficient, thereby generating a detection voltage; and a compensation device connected in series with the light emission element and the driving transistor as well as the power supply, for power-amplifying the detection voltage and generating a compensation voltage which follows the detection voltage, thereby generating a differential voltage between the power source voltage of the power supply and the compensation voltage, between tow ends of the light emission element and the driving transistor, wherein when there is a change in the power source voltage of the power supply, the compensation device generates a compensation voltage, so as to make a changing rate of the differential voltage applied between tow ends of the light emission element and the driving transistor, to become smaller than a changing rate of the power source voltage which has involved a change.

2. The illumination control circuit according to claim 1, wherein said detecting device has voltage dividing resistor capable of adjusting said coefficient, divides said differential voltage by virtue of voltage dividing resistor, and generates a divided voltage.

3. The illumination control circuit according to claim 2, wherein said detecting device has an electronic element for generating said reference voltage, said electronic element and voltage dividing resistor are connected in series with respect to the power source voltage of the power supply.

4. The illumination control circuit according to claim 1, wherein the DC voltage of control signal is adjustable.

5. The illumination control circuit according to claim 1, wherein said compensation device is formed of a transistor which performs a power amplification and generates said compensation voltage in accordance with said detection voltage;

wherein said generating device has a smoothing device for smoothing a duty-adjustable switching signal and generating the control signal of DC voltage.

6. An illumination control circuit for driving and controlling a light emission element, said circuit comprising:

a driving transistor connected in series with said light emission element and a power supply;

a detecting device for detecting a differential voltage between a power source voltage of the power supply and a predetermined reference voltage, and generating a detection voltage formed by adding a voltage divided by dividing said differential voltage with an adjustable coefficient and said reference voltage;

a switching element for switching said detection voltage in accordance with PWM signal for setting a brightness of said light emission element, and outputting a switching signal;

a smoothing device for smoothing said switching signal and generating a control signal of DC voltage; and a compensation device for controlling said driving transistor in accordance with a DC voltage of the control signal, and causing said power supply to supply a driving voltage proportional to the DC voltage to said light emission element, wherein when there is a change in the power source of the power supply, the DC voltage of the control signal changes at a changing rate smaller than a changing rate of a changed power source voltage in accordance with said coefficient, thereby inhibiting a driving electric power of said driving transistor on said light emission element in accordance with said coefficient.

7. The illumination control circuit according to claim 6, wherein said detecting device has voltage dividing resistor capable of adjusting said coefficient, divides said differential voltage by virtue of voltage dividing resistor, and generates a divided voltage.

8. The illumination control circuit according to claim 6, wherein the compensation device is a transistor for controlling a control current of the driving transistor in accordance with the DC voltage of the control signal.

* * * * *